March 13, 1928.  1,662,512

H. S. GOLDEN

CLUTCH WITH TOOTH PLATES

Filed Aug. 28, 1925

Inventor
Harry S. Golden
By Backhouse, Spencer & Thial
Attorney

Patented Mar. 13, 1928.

1,662,512

UNITED STATES PATENT OFFICE.

HARRY S. GOLDEN, OF FLINT, MICHIGAN, ASSIGNOR TO GENERAL MOTORS CORPORATION, OF DETROIT, MICHIGAN, A CORPORATION OF DELAWARE.

CLUTCH WITH TOOTH PLATES.

Application filed August 28, 1925. Serial No. 53,137.

This is an improvement upon the clutch disclosed in the patent to DeWaters, No. 1,287,257, granted December 10, 1918. It is one of the objects of this invention to provide a clutch structure of this general type in which all parts are inclosed and the clutch disks are securely held in alignment. Another object is to provide a clutch of the friction disk type in which the disks are more effectively keyed to the respective driving and driven members. Another advantage which my structure possesses is that the parts are so arranged that the greatest possible area of the friction disks is available for frictional engagement.

Figure 1:
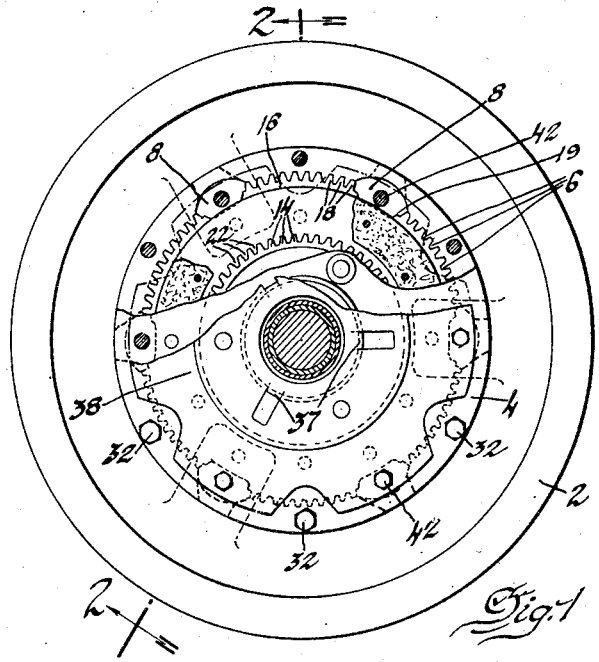

Referring to the drawings, Figure 1 is an elevation of my clutch assembly, certain of the parts being broken away.

Figure 2:
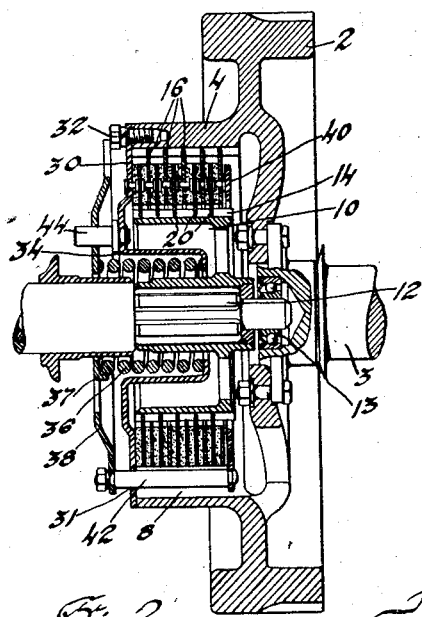

Figure 2 is a section on line 2, 2 of Figure 1. The reference character 2 indicates a driving member, in this case the usual flywheel, which is secured upon the crankshaft shown at 3. An annular flange 4 is provided on the member 2 forming a drum within which the parts of the clutch are received. The flange 4 is provided with a multiplicity of internal teeth 6 arranged in groups separated by cutaway portions 8, the purpose of which will be stated later.

The driven member is indicated by the reference character 10 and is keyed to the driven shaft 12 which is journaled at 13 in the end of the crankshaft 3. The member 10 is provided with external teeth 14.

The motion of the driving member 2 is imparted to the driven member 10 through a plurality of disks provided with the usual friction facings, one set of disks, numbered 16, being keyed to the driving member by means of teeth 18 which interfit with the teeth 6 of the driving member, and the other set of disks 20 being keyed to the driven member 10 by means of teeth 22 which interfit with the teeth 14 of the driven member. The disks 16 are provided with cutaway portions 19 between the groups of teeth, these portions corresponding to the cutaway portions 8 of the flange 4.

The means for clamping the driving and driven plates together to effect the drive will now be described. A plate 30 is secured to the flange 4 by any suitable means such as bolts 32. This plate serves to close the end of the drum formed by the flange 4 and the flywheel and is provided with a socket 34 for receiving spring 36. The bottom of this socket 34 serves as a stationary abutment against which the spring 36 acts. The other end of the spring bears against a movable plate 38 which is connected to a floating plate 40 arranged between the innermost of the series of friction disks and the flywheel, by means of a series of spacer bolts 42, these bolts passing through the cutaway portions 8 and 19 of the flange 4 and disks 16, respectively, and openings 31 in plate 30, and lying substantially in line with the teeth on said members. Plate 30 is provided with the customary lugs 44 engaging apertures in the plate 38 for guiding the latter, and with downwardly pressed fingers 37 for centering the spring upon the plate. It will now be apparent that the spring 36 operating against the fixed abutment constituted by the bottom of the socket 34 will force the plate 38 outwardly and, with it, the floating plate 40 through the connection afforded by bolts 42. This will effect a sliding of the friction plates with respect to the driving and driven members until they are firmly clamped together whereupon power may be transmitted from the driving member to the driven member. To release the clutch, pressure is applied to the plate 38 by any suitable arrangement of levers, not shown, thus relieving the pressure of the spring 36 and permitting separation of the plates.

The flange 4 and the plate 30 provide a complete enclosure for the operating parts of the clutch. Likewise the flange 4 holds the driving plates at all times in exact alignment, a function not so well accomplished in constructions in which driving studs are used in place of the flange. The arrangement of the parts connecting the floating plate 40 and the plate 38 in line with the outer circle of interfitting teeth permits the use of a maximum portion of the surface of the friction disks for frictional engagement.

I claim:

1. The combination of a driving member provided on one side thereof with an annular flange having a plurality of internal teeth, a driven member extending in alignment with the said driving member and having a plurality of external teeth, driving and driven friction disks housed within said flange and having teeth for engagement with said internal and external teeth, respectively, a member secured to said flange and closing the outer end of the drum formed thereby, said member being provided with an inwardly extending socket, a spring housed in said socket and bearing at one end against the inner end of the socket, a plate against which the outer end of the spring bears, and means connected to said plate for moving the disks into engagement with each other, said last-named means including a plate lying between the innermost disk and the driving member and members connecting the said plate to the first-mentioned plate, said members lying substantially in line with the outer circle of interfitting teeth.

2. The combination of a driving member provided on one side thereof with an annular flange having a plurality of internal teeth, a driven member extending in alignment with the said driving member and having a plurality of external teeth, driving and driven friction disks housed within said flange and having teeth for engagement with said internal and external teeth, respectively, a member secured to said flange and closing the outer end of the drum formed thereby, said member being provided with an inwardly extending socket, a spring housed in said socket and bearing at one end against the inner end of the socket, a plate against which the outer end of the spring bears, said plate being formed with inwardly pressed fingers extending down over the said spring for centering the latter.

In testimony whereof I affix my signature.

HARRY S. GOLDEN.